(12) United States Patent
Meinsen

(10) Patent No.: US 8,150,821 B2
(45) Date of Patent: Apr. 3, 2012

(54) SYSTEM AND METHOD FOR USING GENERIC UTILITIES TO PERFORM DATABASE UTILITIES ON MAINFRAME OPERATED DB2 DATABASES

(75) Inventor: David Meinsen, Independence, MO (US)

(73) Assignee: Embarq Holdings Company LLC, Overland Park, KS (US)

( * ) Notice: Subject to any disclaimer, the term of this patent is extended or adjusted under 35 U.S.C. 154(b) by 780 days.

(21) Appl. No.: 12/006,507

(22) Filed: Jan. 3, 2008

(65) Prior Publication Data
US 2009/0177705 A1    Jul. 9, 2009

(51) Int. Cl.
*G06F 17/00* (2006.01)
(52) U.S. Cl. .................. 707/705; 707/752; 714/726
(58) Field of Classification Search .................. None
See application file for complete search history.

(56) References Cited

U.S. PATENT DOCUMENTS

| | | | |
|---|---|---|---|
| 5,778,387 A * | 7/1998 | Wilkerson et al. | 1/1 |
| 5,857,203 A | 1/1999 | Kauffman et al. | |
| 7,664,792 B2 | 2/2010 | Meinsen | |
| 2004/0250033 A1 | 12/2004 | Prahlad et al. | |
| 2005/0240815 A1 | 10/2005 | Purkeypile et al. | |
| 2006/0101384 A1 | 5/2006 | Sim-Tang et al. | |
| 2006/0236151 A1 * | 10/2006 | Costlow et al. | 714/16 |

OTHER PUBLICATIONS

Final Office Action date mailed Jun. 2, 2009 for U.S. Appl. No. 11/656,590.
Amendment after final filed Jul. 20, 2009 for U.S. Appl. No. 11/656,590.
Advisory Action date mailed Jul. 20, 2009 for U.S. Appl. No. 11/656,590.
RCE/Response filed Sep. 2, 2009 for U.S. Appl. No. 11/656,590.
Notice of Allowance date mailed Oct. 1, 2009 for U.S. Appl. No. 11/656,590.
Final Office Action date mailed Jun. 1, 2009 for U.S. Appl. No. 11/656,591.
Amendment after Final filed Jul. 14, 2009 for U.S. Appl. No. 11/656,591.
Advisory Action date mailed Jul. 24, 2009 for U.S. Appl. No. 11/656,591.
Amendment after Final filed Jul. 24, 2009 for U.S. Appl. No. 11/656,591.
RCE filed Aug. 10, 2009 for U.S. Appl. No. 11/656,591.
Non-Final Office Action date mailed Sep. 4, 2009 for U.S. Appl. No. 11/656,591.
Response filed Dec. 4, 2009 to Non-Final Office Action date mailed Sep. 4, 2009 for U.S. Appl. No. 11/656,591.
Non-Final Office Action date mailed Jan. 22, 2009 for U.S. Appl. No. 11/656,590.
Response filed Apr. 10, 2009 to Non-Final Office Action date mailed Jan. 22, 2009 for U.S. Appl. No. 11/656,590.
Non-Final Office Action date mailed Jan. 23, 2009 for U.S. Appl. No. 11/656,591.
Response filed Apr. 16, 2009 to Non-Final Office Action date mailed Jan. 23, 2009 for U.S. Appl. No. 11/656,591. Supplemental Response and Terminal Disclaimer Filed Jan. 5, 2010 in U.S. Appl. No. 11/656,591.
Notice of Allowance dated Jan. 26, 2010 in U.S. Appl. No. 11/656,591.
Transmittal of Formal Drawings filed Feb. 22, 2010 in U.S. Appl. No. 11/656,591.

* cited by examiner

*Primary Examiner* — Belix M Ortiz

(57) ABSTRACT

A system and method for performing database utilities on a DB2 database may include using a single procedure (proc) for each database utility function. At least one parameter may be provided, where the at least one parameter identifies a DB2 database name. A generic control card may be accessed, where the generic control card may be identified by a value of the parameter(s). A utility control card may be generated using the at least one parameter. A database utility may be executed on a DB2 database by using the generated utility control card.

11 Claims, 3 Drawing Sheets

SYSTEM AND METHOD FOR USING GENERIC UTILITIES TO PERFORM DATABASE UTILITIES ON MAINFRAME OPERATED DB2 DATABASES

BACKGROUND

Companies in many different industries handle large database operations using mainframe computers. One such industry is the telecommunications industry, where databases are used to store detailed subscriber records. These databases are large and require routine maintenance to manage them due to a number of reasons, including crashes, updates, corrections, and verifications.

One mainframe manufacturer is International Business Machines (IBM). IBM also provides a database software program known as DB2, which can manage very large databases (e.g., several hundred Gigabytes). As understood in the art, mainframe computers operate by processing jobs that are scheduled in a queue. These jobs are formed by a series of statements or commands that are processed by a processor of the mainframe computer. Jobs are generally statements formatted in the job control language (JCL). Typically, a mainframe computer runs a job by scheduling and executing a file with JCL commands or statements configured for the mainframe computer to perform a task, such as re-loading a database from a certain time. In addition to the file with JCL statements, control cards are used to set parameters for the jobs and know the syntax of the control cards. The control cards are typically eighty-byte strings that have each byte and groups of bytes representative of the different parameters. The JCL commands and control cards are comprehensive and generally require well-trained database administrators to adequately generate proper job files and control cards to perform even routine procedures and maintenance on DB2 databases.

To aid database administrators, IBM provides database utilities. These utilities are JCL programs that are configured to perform certain functions. The database administrator, however, must generate a procedure, generally known as a "proc," and control card for each job. Companies that manage large numbers of databases, such as telecommunication service providers, may have over 25,000 databases. To perform a single, routine or regularly executed function on each database, a JCL command file, proc file, and control card must be created. Typically, six or more regularly executed operations, including check copy, modify, reorg, quiesce, and runstats, and many non-regularly schedule operations are performed on each database. This means that in the event of a global change to any of the JCL command files, proc files, or control cards, 150,000 or more file edits must be made.

FIG. 1 is an illustration of a system 100 having representative databases 102a-102n (collectively 102) and software structure 103 for performing existing DB2 database operations using JCL files 104a-104n, procs 106a-106n, and control cards 108a-108n. As shown, each database uses three software components (i.e., JCL file, proc file, and control card) to perform a single operation (e.g., copy operation). As understood in the art, creating and managing software of the software structure 103 is time consuming, costly, and reliant on a limited number of skilled employees. Even with skilled employees, it is not uncommon for run-time errors to be caused by improperly written control cards. The DB2 databases are provided with a user interface, but the user interface is a single screen that is confusing to skilled database administrators and limited to interfacing with utilities provided by IBM. Other vendors provide different utility programs, but these, too, require control cards having different formats to be generated by the user. And, the other vendors' utilities have different, similarly complex user interfaces. Another problem that exists with existing utilities provided by IBM and other vendors is the complexity of reports produced by the utilities. The reports generated by current utilities are cluttered, provide too much information, and are generally difficult to interpret.

These and other issues result in significant costs and expenses to staff database operations with database administrators. For example, in a typical telecommunications company, twenty or more database administrators are needed to manage the customer database and support database developers because the database developers are unfamiliar and generally unskilled to generate the necessary database utility operations needed during database development projects and interpret the resulting reports. This number of database administrators is generally needed because of the amount of time needed to generate JCL files, proc files, and control cards using the utilities available by both IBM and other vendors.

SUMMARY

To overcome the difficulties of using DB2 database utilities on mainframes, minimize costs of staffing a database with database administrators, and increase the speed at which utility jobs can be created and revised, the principles of the present invention provide for generic database utilities that enable an operator to modify one set of utilities to perform a global change to procs and eliminate the use of control cards.

A system and method for performing database utilities on a DB2 database may include using a single procedure (proc) for each database utility function. At least one parameter may be provided, where the at least one parameter identifies a DB2 database name. A generic control card may be accessed, where the generic control card may be identified by a value of the parameter(s). A utility control card may be generated using the at least one parameter. A database utility may be executed on a DB2 database by using the generated utility control card.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 2:
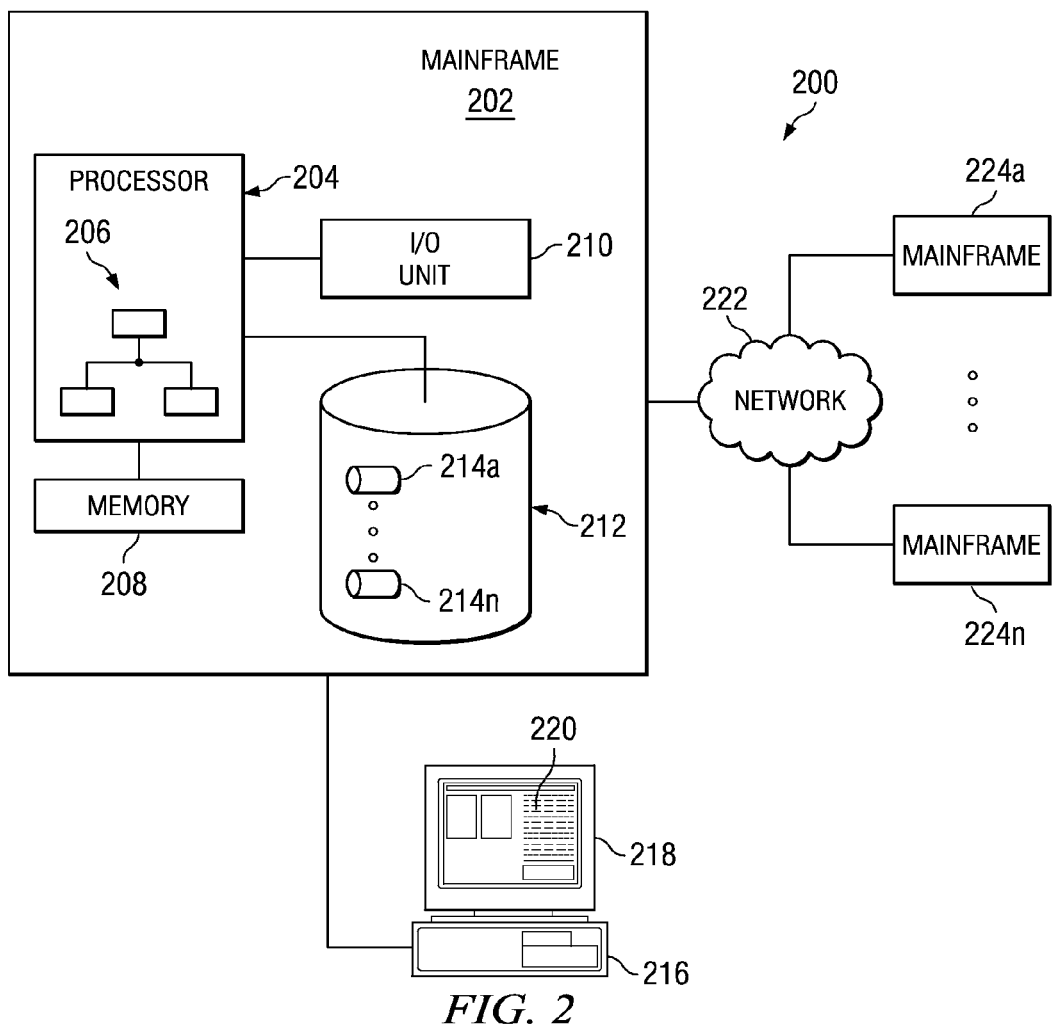
FIG. 2 is an illustration of an exemplary system having representative databases and software structure for performing DB2 database operations using JCL files and generic procs.

FIG. 2 is an illustration of an exemplary system 200 that includes a mainframe computer 202 on which the principles of the present invention may be operated. The mainframe computer 202 includes one or more processors 204 that execute software 206. The processor(s) 204 may be in communication with memory 208, input/output (I/O) unit 210, and storage unit 212. The storage unit may store one or more databases 214a-214n (collectively 214). The database(s) 214 may be relational databases or hierarchical databases. In one embodiment, the relational database is a DB2 database produced by IBM A user interface device 216, such as a terminal, personal computer, or otherwise, may include an electronic display 218 that displays text and/or images 220 thereon. The user interface device 216 may be utilized by a user, such as a database administrator, developer, or otherwise, to interact with the database(s) 214. In addition, the mainframe computer 202 may be in communication with a network 222 to which other mainframe computers 224a-224n (collectively 224) are in communication. These other mainframe computers 224 may be utilized by other parts of a corporation, such as a telecommunications service provider, for storing and operating databases thereon.

In operation, the mainframe computer 202 may execute the software 206 for operating the database(s) 214 stored in the storage unit 212. In the case of the database(s) 214 being DB2 databases, these databases are challenging for users to perform utilities due to confusing user interfaces provided by utility developers, including IBM and control cards that are difficult to understand even by the most seasoned database administrator. In accordance with the principles of the present invention, the software 206 may include a database utility system that provides intuitive user interfaces that is capable of generating JCL command files that include parameters, thereby eliminating the need for control cards to be used during execution of a job as the parameters entered by a user are included in the JCL command file.

Figure 1:
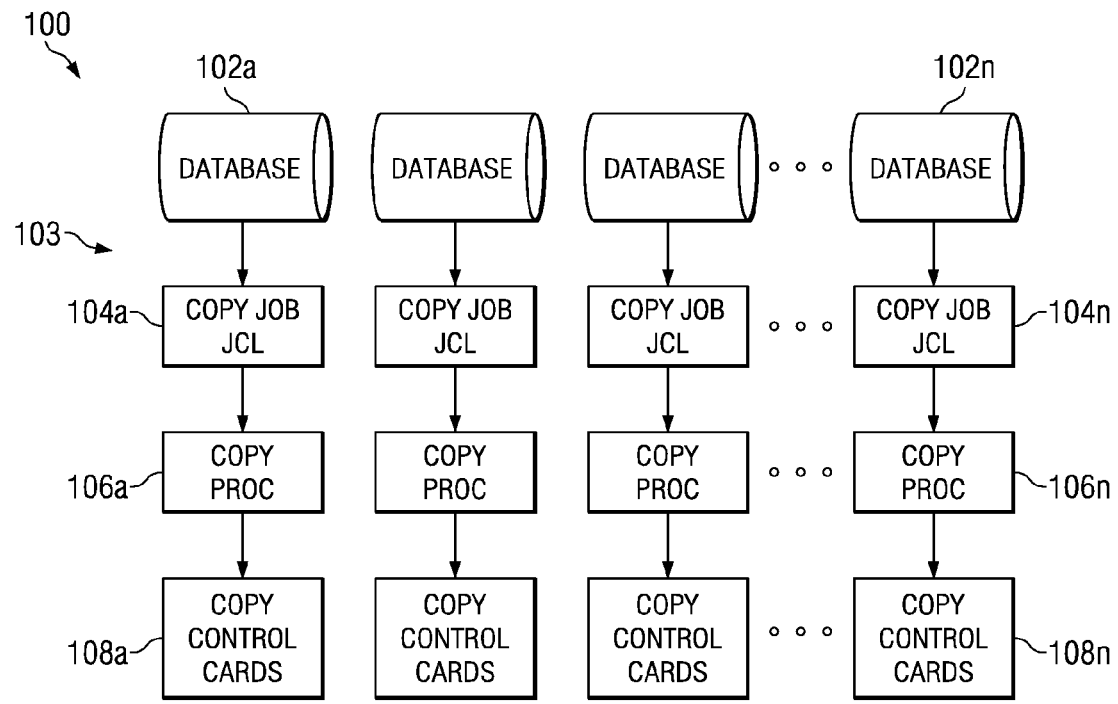
FIG. 1 is an illustration of a system having representative databases and software structure for performing existing DB2 database operations using JCL files, procs, and control cards.
Figure 3:
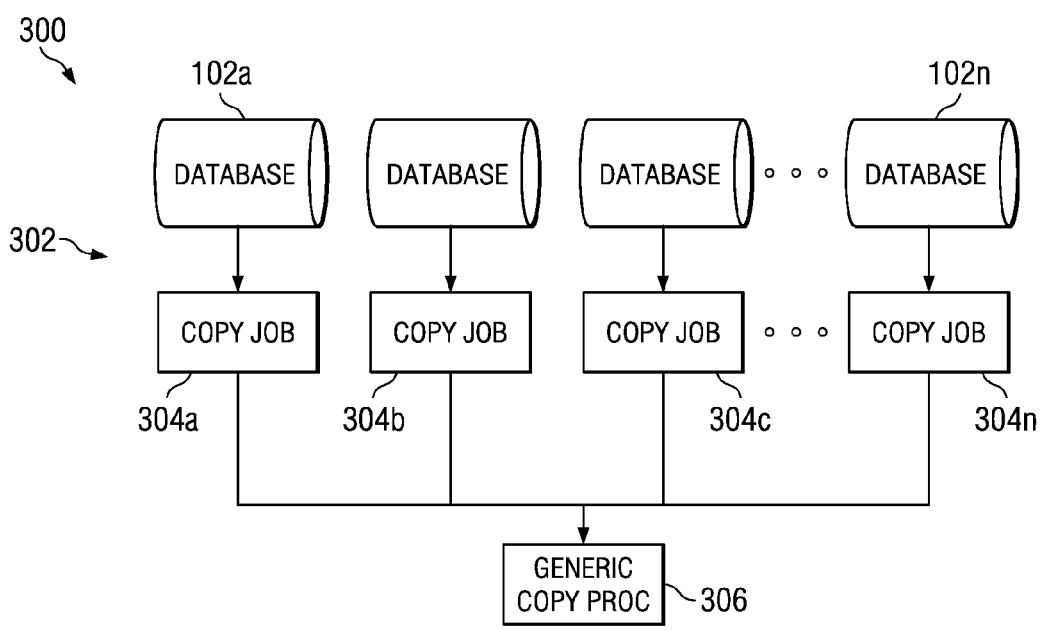
FIG. 3 is a block diagram of databases and an exemplary software structure that utilizes a generic database utility in accordance with the principles of the present invention.

FIG. 3 is a block diagram 300 of databases 102 and an exemplary software structure 302 that utilizes a generic database utility in accordance with the principles of the present invention. As understood in the art, each database 102a-102n has an associated job that is executed to cause one or more certain parameters or "PARMS" to be input into a generic procedure or "proc" to perform a particular function on a respective database 102a-102n. Inputting the PARMS into a generic proc may mean to create a dataset and use symbolics that are expanded to include the PARMS during an expansion process. In the example shown, each database 102a-102n has a respective copy job 304a-304n (collectively 304) that is executed to cause data in the respective database 102a-102n to be copied for backup or other purpose. Each copy job causes parameter(s) associated with the respective database to be input into a generic proc. The generic copy proc 306 receives the PARM(S) and is executed. The genetic copy proc 306 may include symbolics (e.g., "TB=" and "DB=") that are expanded in building a JCL command file, as understood in the art. As provided by the software structure 302 of FIG. 3, only a single, generic proc is utilized for each database utility and no control cards are used. By eliminating individual, customized procs and control cards, significant time to create and manage procs and control cards is eliminated and less skilled workers may be utilized to perform routine database operations. Furthermore, standardized JCL, control cards, and dataset names may be created, thereby reducing or eliminating differences in software created by different programmers. In generating procs, the principles of the present invention may utilize the teachings of co-pending U.S. patent application Ser. No. 10/969,537 filed Oct. 20, 2004, which is incorporated herein by reference in its entirety.

TABLE I includes an exemplary list of proc names, job or function descriptions, and job suffixes. These procs are typical, routinely executed functions that are executed on databases maintained by mainframe computers. As previously described, each of these procs conventionally are supported with jobs and control cards. However, through the use of generic DB2 utilities, the principles of the present invention enable elimination of customized procs and control cards, thereby reducing the total number of procs and eliminating customized control cards. In place of customized control cards, "skeleton" or generic control cards may be stored in a library of generic control cards, where a skeleton control card provides generic operation for a respective proc. PARMS that are expanded into the procs determine which control card member is used when executed.

TABLE I

Generic Proc Names and Job Suffixes

| Proc Name | Job Description |
| --- | --- |
| DB2CKI$ | Check data |
| DB2STI$ | Start |
| DB2ICB$ or DB2ICP$ | Image copy |
| DB2LOB$ | Load tablespace |
| DB2MRI$ or DB2MAI$ | Modify recoverery |
| DB2INI$ | Initialize tablespace |
| DB2ROB$ or DB2RAB$ | Reorg tablespace |
| DB2RIB$ | Reorg index |
| DB2QUI$ or DB2QUB$ | Quiesce |
| DB2RCI$ | Recover |
| DB2BII$ | Rebuild index |
| DB2RSI$ | Runstats |
| DB2ULB$ | Unload tablespace |
| DB2MSI$ | Modify stats |
| DB2UTI$ | Miscellaneous utilities (repair, report, etc) |

In operation, the generic utilities use a software program, "DB010A01," which writes a dataset that includes PARM field(s) plus a skeleton or generic control card, where the control card may be stored in a library, such as "DBAdb2ssid.PARMLIB." Member or generic control card names used are determined at execution by a PARM on the EXEC statement. The control card for performing a command, such as COPY TABLESPACE &DB..&TS, in the PARM field is written to a temporary dataset after JCL expansion or substitution. The "&" is a symbolic that causes the PARMS "DB" and "TS" to be expanded. The command is concatenated with one or more skeleton control cards to create the utility control cards used by the job. Some systems may use different dataset names and options. To accommodate the different systems, system specific options may be created by adding members to the library without having to change the generic procs in production. These options should be created at a system level and not data base level.

Figure 4:
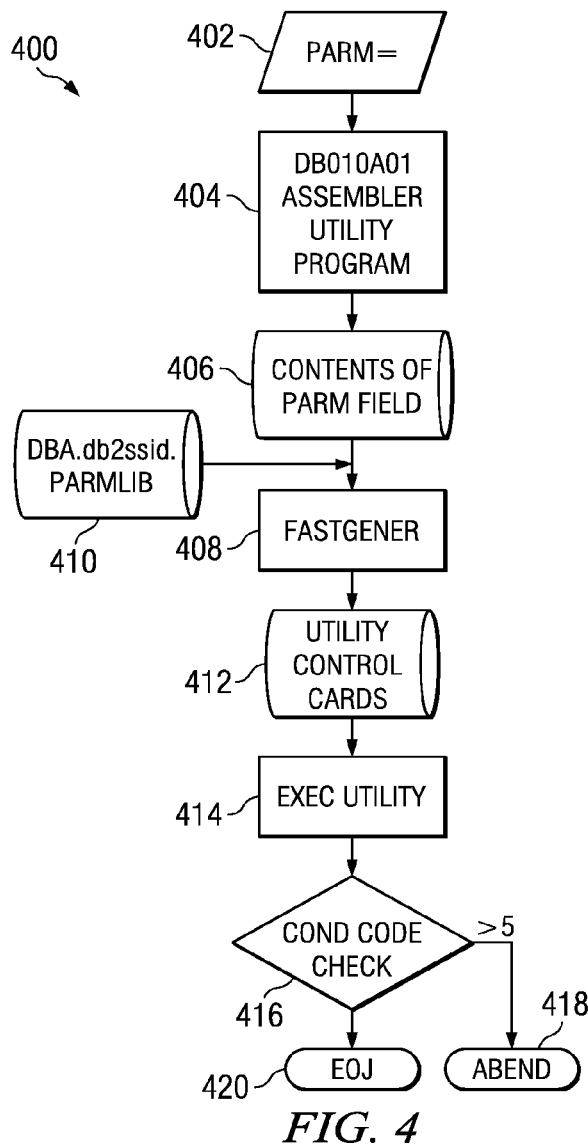
FIG. 4 is a flow diagram of an exemplary process showing how generic DB2 utilities work.

FIG. 4 is a flow diagram of an exemplary process 400 showing how generic DB2 utilities work The process 400 may start at step 402, where a PARM field is defined. The PARM field may be defined within a JCL assembler utility program (e.g., "DB010A01") at step 404. Contents of the PARM field may be input at step 406 into a software program (e.g., "FASTGENER") at step 408 that generates a JCL command file by receiving a generic control card from a library (e.g., DBA.db2ssidPARMLIB) at step 410 based on symbolics in an execute statement (i.e., "EXEC") in the JCL, as provided in the below exemplary JCL statements.

```
//      INCLUDE MEMBER=$PRD015
//JS010 EXEC DB2ROB$,DB=DCLP0001,TS=SCLP1010,OPT=
   'ANALYZE ONLY',SHRLVL=1
```

It should be understood that control cards are not generated by the generic procs, but rather are generated from the PARM field in JCL assembler utility program (e.g., "DB010A01") and library DBA.db2ssid.PARMLIB based on the symbolics in the execute statement in the JCL. In most cases, the member name in the library PARMLIB has the same name as the PROC name.

At step 412, utility control cards are generated from the software program of step 408. The utility provided by the utility control cards are executed at step 414. A condition code check is performed at step 416, where if the condition code is greater than 5, the utility is abended or abort/ended at step 418. Alternatively, the job is ended at step 420.

An example of JCL statements used in performing an image copy is provided below. The image copy is an IBM® company image copy for DB2 databases. The name of the proc is DB2IC$, which is commonly known as an "I" job, meaning IBM job. If a letter "B" were used, it would indicate that a BMC utility is being used. The purpose of this proc is to image copy tablespaces for a DB2 databases using the IBM® utility. The DB2 subsystem ID and the SMFID variables are set by the $PRD01? (where ? is the JES) include member in the JCL. A database name is specified in the EXEC statement. All tablespaces in the database are processed by this job unless TS=is specified. Wildcards (% and *) can be use in DB=and TS=parms. Specify SHRLVL=1 for REFERENCE (default) or SHRLVL=2 for CHANGE. Since control cards for the utility are not required by this proc, there is no need to create control cards for this job. The utility will be recorded as user.job name. This proc uses a LISTDEF to wildcard. It should be understood that other procs may be configured in the same or similar manner as provided below.

```
//jobnameI JOB (7002,PROD),OPERATIONS,CLASS=
B,MSGCLASS=S,SCHENV='PROD_DB21'
//$SYSID INCLUDE MEMBER=$PRD011
//JS010 EXEC DB2ICI$,
//      DB=DCLP0001
REQUIRED PARMS ON EXEC STATEMENT
DB=DATA BASE NAME    (wildcards _ or % can be used)
OPTIONAL PARMS ON EXEC STATEMENT
TS=TABLESPACE NAME    (default is all)
SHRLVL=1
Specify SHRLVL=1 for SHARE LEVEL REFERENCE
Specify SHRLVL=2 for SHARE LEVEL CHANGE
UNIT=TAPE (default is DISK)
OPT='EXCLUDE DB.TS,DB.TS'
UTPROC=RESTART OR PREVIEW (default is blank)
Use UTPROC=PREVIEW to view control cards without executing the
utility
UID=utility ID (default is user.job name)
PROC STEP NAMES
DB010A01    DB010A01    CREATE UTILITY CONTROL CARDS
GENER       FASTGENR    COPY CONTROL CARDS
COPY        ACPMAIN     IBM IMAGE COPY
CONTROL CARDS
DBA.&SYSTEM..PARMLIB(DB2M&UNIT)
LISTDEF A INCLUDE TABLESPACES TABLESPACE &DB..&TS/
&OPT
DBA.&SYSTEM..PARMLIB(DB2ICI$&SHRLVL)
```

The purpose of the assembler utility program (i.e., DB010A01) is to take the PARM field on the execute statement and write it to a dataset. The dataset can be used to build control cards from the PARM using JCL symbolics instead of having to create unique control card members for each job. This program is executed in procs before a step needing control cards. At execution time, any PARMS that change in the control card are substituted with the PARMS specified on the EXEC statement. By using this simple utility, thousands of control cards may be eliminated. Since the PARM determines the control cards created, this program can be used in any proc.

Figure 5:
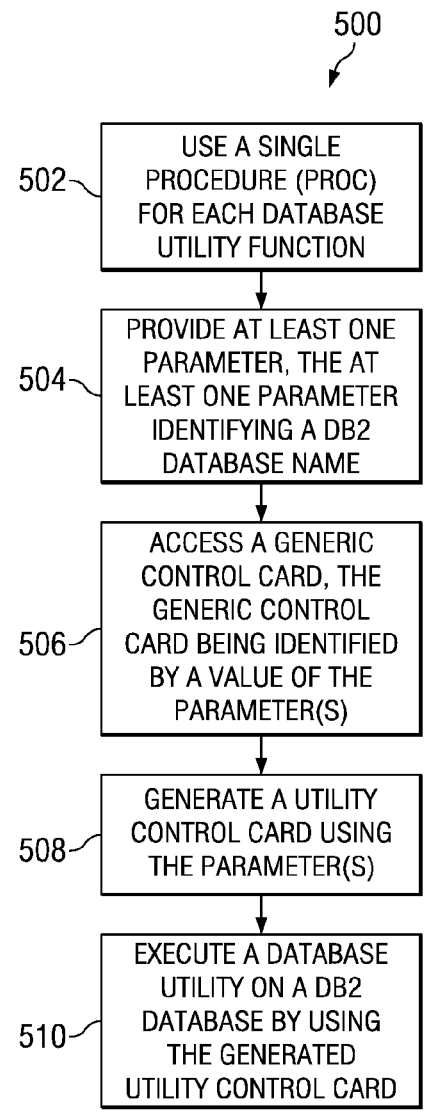
FIG. 5 is a flow diagram of an exemplary process for creating and operating database utilities using generic database utilities in accordance with the principles of the present invention.

FIG. 5 is a flow diagram of an exemplary process 500 for creating and operating database utilities using generic database utilities in accordance with the principles of the present invention. The process starts at step 502, where a single procedure (proc) may be used for each database utility function. By using a single procedure for each database utility function, the significant number of procs may be eliminated, thereby minimizing changes when updates occur. At step 504, at lease one parameter is provided, where the at least one parameter identifies a DB2 database name. At step 506, a generic control card is accessed. The generic control card may be identified by a value of the parameter(s). A utility control card may be generated using the parameter(s) at step 508. At step 510, a database utility may be executed on a DB2 database by using the generated utility control card.

The previous detailed description is of a small number of embodiments for implementing the invention and is not intended to be limiting in scope. One of skill in this art will immediately envisage the methods and variations used to implement this invention in other areas than those described in detail. The following clams set forth a number of the embodiments of the invention disclosed with greater particularity.

What is claimed:

1. A method for performing database utility functions on a DB2 database, said method comprising:
    using a single procedure (proc) for performing a database utility function;
    calling the single procedure for performing the database utility function using an EXEC STATEMENT; wherein the EXEC STATEMENT includes at least one parameter including a database name parameter and an optional tablespace name parameter, wherein if the optional tablespace name parameter is not specified in the EXEC STAEMENT, then all tablespaces in a database specified by the database name parameter are processed;
    accessing a generic control card stored in a software library containing a plurality of generic control cards, the generic control card being identified by a value of the at least one parameter;
    generating a utility control card using the at least one parameter and generic control card; and
    executing a database utility on a DB2 database by using the generated utility control card.

2. The method according to claim 1, further comprising not generating the utili control card in response to a determination that no control card is needed for the single procedure for performing the database utility function.

3. The method according to claim 1, further comprising including symbolics to be used for expansion in creating the utility control card.

4. The method according to claim 1, generating the utility control card includes generating the utility control card when a job is executed.

5. The method according to claim 1, wherein generating the utility control card causes the utility control card to be error-free.

6. A system for performing database utility functions on a DB2 database, said system comprising:
a mainframe computer, including:
at least one storage unit;
at least one database stored on said at least one storage unit;
a software library stored on said at least one storage unit;
a processing unit configured to:
use a single procedure (proc) for performing a database utility function;
call the single procedure for the database utility function using an EXEC STATEMENT; wherein the EXEC STATEMENT includes at least one parameter, the at least one parameter including a database name parameter and an optional tablespace name parameter, wherein if the optional tablespace name parameter is not specified in the EXEC STATEMENT then all tablespaces in a database specified by the database name parameter are processed;
retrieve a generic control card identified by a value of the at least one parameter, the generic control card being retrieved from said software library containing a plurality of generic control cards;
create a utility control card using the generic control card and the at least one parameter; and
execute a database utility by using the utility control card to perform a database utility function on a DB2 database identified by the DB2 database name.

7. The system according to claim 6, further comprising not generating the utility control card in response to a determination that no control card is needed for the single procedure for performing the database utility function.

8. The system according to claim 6, wherein said processing unit is configured to look up the generic control card in said software library using the at least one parameter.

9. The system according to claim 6, wherein said processing unit is further configured to replace symbolics with the at least one parameter during JCL expansion.

10. The system according to Claim 6, wherein said processing unit is configured to automatically generate the utility control card when a job is executed.

11. The system according to claim 6, wherein said processing unit is configured to generate an error-free utility control card.

* * * * *